(12) United States Patent
Yang

(10) Patent No.: US 10,846,531 B2
(45) Date of Patent: Nov. 24, 2020

(54) IMAGE-BASED ANOMALY DETECTION FOR AERIAL INSPECTION USING SELF-SUPERVISED LEARNING

(71) Applicant: The Boeing Company, Chicago, IL (US)

(72) Inventor: Yan Yang, Brisbane (AU)

(73) Assignee: THE BOEING COMPANY, Chicago, IL (US)

( * ) Notice: Subject to any disclaimer, the term of this patent is extended or adjusted under 35 U.S.C. 154(b) by 139 days.

(21) Appl. No.: 16/136,483

(22) Filed: Sep. 20, 2018

(65) Prior Publication Data

US 2020/0097720 A1    Mar. 26, 2020

(51) Int. Cl.
*G06K 9/00* (2006.01)
*G06K 9/62* (2006.01)
*G06K 9/32* (2006.01)
*G06N 3/08* (2006.01)

(52) U.S. Cl.
CPC ....... *G06K 9/00637* (2013.01); *G06K 9/3241* (2013.01); *G06K 9/6256* (2013.01); *G06N 3/08* (2013.01)

(58) Field of Classification Search
None
See application file for complete search history.

(56) References Cited

U.S. PATENT DOCUMENTS

2015/0347872 A1* 12/2015 Taylor ................. G06T 7/11
                                                382/224
2018/0174049 A1* 6/2018 Pauly .................. G06N 3/084
2020/0074238 A1* 3/2020 Umeno ................ G06K 9/6215

OTHER PUBLICATIONS

Yuan Xu, Shiming Xiang, Chunlei Huo, Chunhong Pan, "Change detection based on auto-encoder model for VHR images," Proc. SPIE 8919, MIPPR 2013: Pattern Recognition and Computer Vision, 891902; Oct. 27, 2013.
B. Ayhan, M. Dao, C. Kwan, H. M. Chen, J. F. Bell and R. Kidd, "A Novel Utilization of ImageRegistration Techniques to Process Mastcam Images in Mars Rover With Applications to Image Fusion, Pixel Clustering, and Anomaly Detection," in IEEE Journal of Selected Topics in Applied Earth Observations and Remote Sensing, vol. 10, No. 10, pp. 4553-4564, Oct. 2017.

(Continued)

*Primary Examiner* — Leon Viet Q Nguyen
(74) *Attorney, Agent, or Firm* — Parsons Behle & Latimer

(57) ABSTRACT

A method of automatically detecting anomaly from aerial images of an object of interest is provided. The method may include generating a data coding model corresponding to a category of assets by training a neural network with a training set of digital images depicting an asset in a state that is free from anomalies. The method may further include receiving a target digital image depicting a target asset, and reconstructing the target digital image using the data coding model to generate a decoded target digital image associated with the state that is free from anomalies. The data coding model may be self-supervised to learn to reconstruct itself to an anomaly-free state. The method may also include comparing the target digital image to the decoded target digital image to generate a difference map and, in response to a determination that the difference map depicts any anomaly, generating anomaly alert data.

20 Claims, 8 Drawing Sheets

(56) References Cited

OTHER PUBLICATIONS

Xu, Dan, et al. "Learning deep representations of appearance and motion for anomalous event detection." arXiv preprint arXiv:1510.01553 (2015). Oct. 6, 2015.

Erfani, Sarah M., et al. "High-dimensional and large-scale anomaly detection using a linear one-class SVM with deep learning." Pattern Recognition 58 (2016): 121-134. 2016.

Zhai, Shuangfei, et al. "Deep structured energy based models for anomaly detection." arXiv preprint arXiv:1605.07717 (2016). Jun. 16, 2016.

* cited by examiner

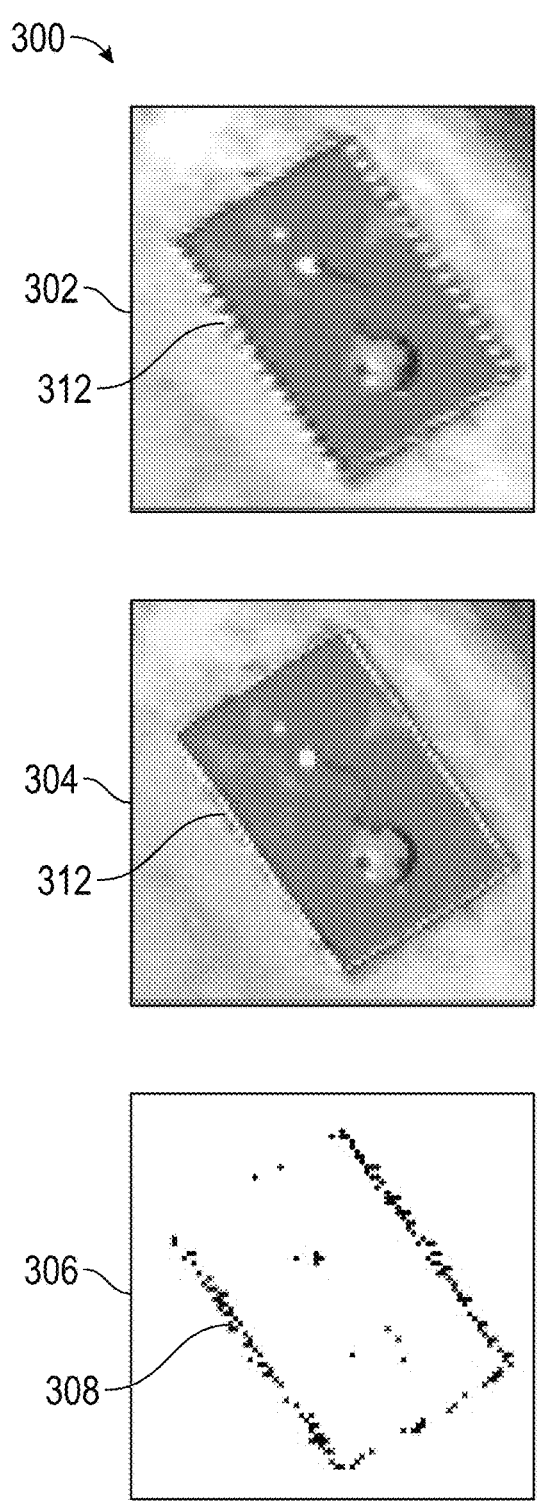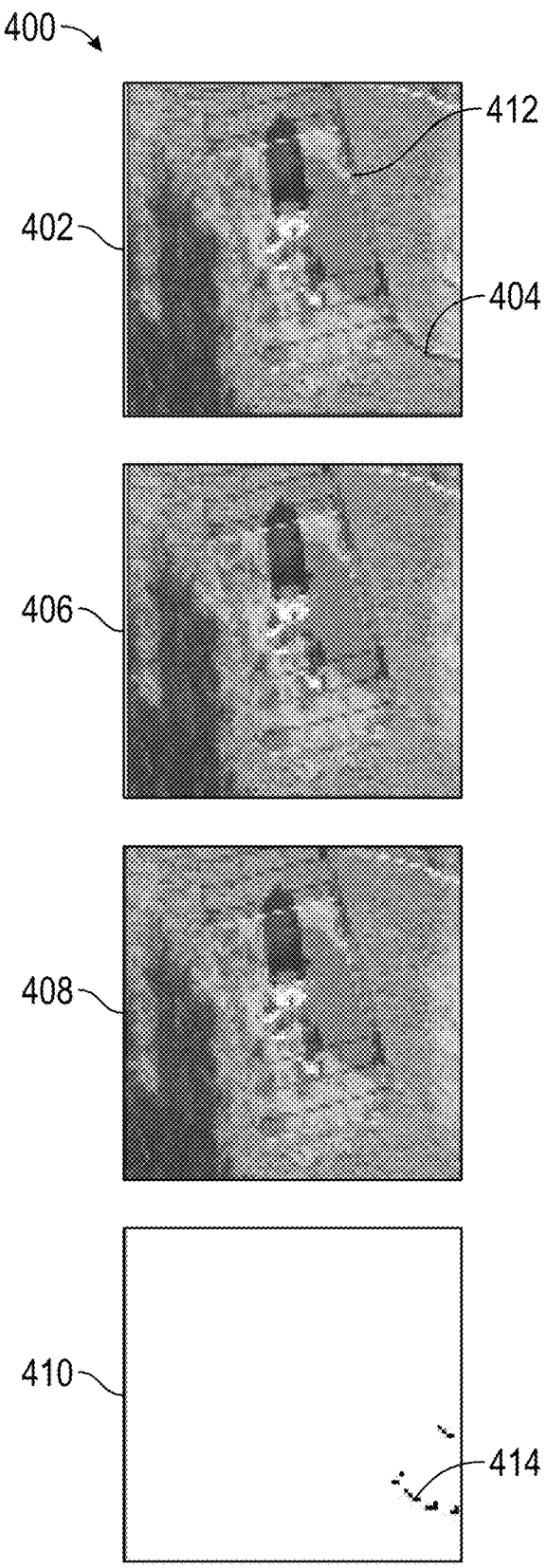
FIG. 3
FIG. 4

IMAGE-BASED ANOMALY DETECTION FOR AERIAL INSPECTION USING SELF-SUPERVISED LEARNING

FIELD OF THE DISCLOSURE

This disclosure is related to image-based anomaly detection using an aircraft such as an unmanned aerial vehicle (UAV) for inspection, survey and surveillance, and in particular to image-based anomaly detection using self-supervised learning models.

BACKGROUND

An important task for aerial inspection, covering a wide geographical area, is detecting when a target structure, i.e., an asset, includes any anomalies. For example, when inspecting a fence, an open gate or a broken portion of the fence may be considered an anomaly. Likewise, when inspecting an enclosed structure, such as a power substation, an animal having become trapped inside may also be considered an anomaly. Generally, an inspection anomaly may be anything detected during inspection that deviates from what is standard, normal, or expected. In wide geographical areas, anomalies may be rare, however, they may lead to significant problems if not attended to promptly. Conducting regular on-site inspections may be costly and inefficient.

Overhead inspection through aerial photographs may significantly ease the costs of regular inspection. For example, drone aircraft may be used to obtain aerial photos of individual assets. In order to detect an anomaly, three types of existing solutions may be used. First, an image change-based approach may be used to compare a current image of the asset to a previous image of the asset. Inherent in this process is the requirement that a previous image exist. This may not be the case for new assets. Further, it can be inconvenient and potentially problematic to store both previous images and new images of the assets. Also, using an image change-based approach may not be reliable in detecting an anomaly if the anomaly already existed in the prior image.

A second solution includes a feature-based classification approach. In this approach, certain features may be associated with a particular type of anomaly. The images may be analyzed to detect the features, and thereby find an anomaly. However, in this approach, each category of anomalies being searched from usually has a corresponding database of features associated with the category of anomalies. Further, only a finite list of known and predetermined anomalies may be detected. New types of anomalies, or anomalies having different visual features may pass undetected.

A third solution includes an outlier detection approach. Outlier detection has been used for intrusion detection in analyzing access data and fraud detection in analyzing financial data. However, a statistical outlier analysis does not apply to image data because image data has many more dimensions than access data or financial data. Further, each image analyzed is unique, making it difficult to define any kind of outlier.

Therefore, typical anomaly detection systems are not sufficient to efficiently and inexpensively detect anomalies without historical imagery and without pre-assumptions. Other disadvantages may exist.

SUMMARY

Disclosed is an anomaly detection system that overcomes at least one of the described disadvantages of the typical anomaly detection systems. The system may create a generative model associated with an anomaly free-state of a category of assets. The generative model may be used to deconstruct a digital image of a target asset and reconstruct a new image that resembles the expected normal state of the target asset. By comparing the reconstructed image and the original image, any anomaly may be detected. Such detection may be performed without any previous images of the target asset.

In a typical anomaly detection system, a neural network may be trained to identify particular anomalies in a feature-based classification approach. However, the disclosed system fundamentally changes the underlying functionality of the typical neural network-based approaches by developing and using a data coding model that corresponds to a "normal," or anomaly free, state instead of corresponding to one or more particular anomalies. Thus, as the neural network of the disclosed system learns to reconstruct an image, it does so by encoding image data to a block of code, then decoding the block of code to a new image that matches the "normal" state, and eliminating features associated with an anomaly instead of attempting to identify and reconstruct the anomalous features themselves. The learning of the data coding model, for example an autoencoder, does not require additional information to learn what to output, it learns to encode, decode and output itself, therefore it's unsupervised, or namely self-supervised machine learning.

In an embodiment, a method includes receiving a set of digital images, each digital image of the set of digital images depicting a distinct asset corresponding to a category of assets, and each digital image depicting the distinct asset in a state that is free from anomalies associated with the category of assets. The method further includes generating a data coding model corresponding to the category of assets by training a neural network with the set of digital images, the data coding model associated with the state that is free from anomalies. The method also includes receiving a target digital image depicting a target asset corresponding to the category of assets. The method includes generating encoded target data by transforming the target digital image using the data coding model. The method further includes generating a decoded target digital image by further transforming the encoded target data using the data coding model, the decoded target digital image associated with the state that is free from anomalies. The method includes comparing the target digital image to the decoded target digital image to generate a difference map. The method further includes in response to a determination that the difference map depicts an anomaly, generating anomaly alert data.

In some embodiments, the neural network is an autoencoder, where generating the encoded target data includes encoding the target digital image using one or more encoding layers of the autoencoder, and where generating the decoded target digital image includes decoding the encoded target data using one or more decoding layers of the autoencoder. In some embodiments, the autoencoder is a deep autoencoder having multiple encoding layers and multiple decoding layers, a convolutional autoencoder, or both.

In some embodiments, the method includes the anomaly alert data includes an annotated digital image depicting the target asset. In some embodiments, the method includes sending the anomaly alert data to a user output device, the user output device including a display device, a speaker device, or both. In some embodiments, the method includes sending the anomaly alert data to a local, or remote database, or both.

In some embodiments, the method includes generating a set of decoded digital images corresponding to the set of digital images using the data coding model, comparing the set of decoded digital images to the set of digital images to generate a set of difference maps, converting the set of difference maps to a binary classification model, and applying the binary classification model to the difference map to categorize the difference map as depicting any anomaly or not depicting any anomaly. In some embodiments, the binary classification model is a support vector machine model.

In some embodiments, the target digital image includes an aerial or satellite photo of the target asset, where the target asset is a physical structure, and where the category of assets includes other assets having a shape, layout, or function that corresponds to a shape, layout, or function of the target asset.

In some embodiments, the method includes generating additional data coding models corresponding to additional categories of assets by training additional neural networks with additional sets of digital images, the additional data coding models associated with additional states that are free from anomalies associated with the additional categories of assets. In some embodiments, the method includes receiving additional target digital images depicting additional target assets corresponding to the additional categories of assets, generating additional encoded target data by encoding the additional target digital images using the additional data coding models, generating additional decoded target digital images by decoding the additional encoded target data using the additional data coding models, comparing the additional target digital images to the additional decoded target digital images to generate additional difference maps, and in response to a determination that at least one of the additional difference maps depicts any anomaly, generating anomaly alert data.

In some embodiments, the method includes altering one or more digital images of the set of digital images to remove a feature that does not correspond to any anomaly associated with the category of assets.

In an embodiment, a system includes one or more processors and one or more memories, the one or more memories including instructions that, when executed by the one or more processors, cause the one or more processors to perform or initiate operations. The instructions may cause the processor to receive a data coding model corresponding to a category of assets, the data coding model associated with a state that is free from anomalies associated with the category of assets. The instructions may further cause the processor to receive a target digital image depicting a target asset corresponding to the category of assets. The instructions may further cause the processor to generate encoded target data by encoding the target digital image using the data coding model. The instructions may further cause the processor to generate a decoded target digital image by decoding the encoded target data using the data coding model. The instructions may further cause the processor to compare the target digital image to the decoded target digital image to generate a difference map. The instructions may also cause the processor to, in response to a determination that the difference map depicts any anomaly, generate anomaly alert data.

In some embodiments, instructions cause the one or more processors to receive a set of digital images, each digital image of the set of digital images depicting a distinct asset corresponding to the category of assets, and each digital image depicting the distinct asset in the state that is free from anomalies associated with the category of assets, and generate the data coding model by training a neural network with the set of digital images.

In some embodiments, the neural network is an autoencoder, where generating the encoded target data includes encoding the target digital image using one or more encoding layers of the autoencoder, and where generating the decoded target digital image includes decoding the encoded target data using one or more decoding layers of the autoencoder, and where the autoencoder is a deep autoencoder having multiple encoding layers and decoding layers, a convolutional autoencoder, or both.

In some embodiments, the instructions cause the one or more processors to generate a set of decoded digital images corresponding to the set of digital images using the data coding model, compare the set of decoded digital images to the set of digital images to generate a set of difference maps, convert the set of difference maps to a binary classification model, and apply the binary classification model to the difference map to categorize the difference map as depicting any anomaly or not depicting any anomaly. In some embodiments, one or more digital images of the set of digital images is artificially altered to remove a feature that does not correspond to any anomaly associated with the category of assets.

In some embodiments, the system includes a user output device, the user output device including a display device, a speaker device, or both, where the instructions cause the at least one processor to send the anomaly alert data to the user output device. In some embodiments, the method includes sending the anomaly alert data to a local, or remote database, or both. In some embodiments, the target digital image includes an aerial or satellite photo of the target asset, where the target asset is a physical structure, and where the category of assets includes other assets having a shape, layout, or function that corresponds to a shape, layout, or function of the target asset.

In an embodiment, a method includes receiving a target digital image depicting a target asset corresponding to a category of assets. The method further includes generating encoded target data by encoding the target digital image using a data coding model corresponding to the category of assets, the data coding model associated with a state that is free from anomalies associated with the category of assets. The method also includes generating a decoded target digital image by decoding the encoded target data using the data coding model. The method includes comparing the target digital image to the decoded target digital image to generate a difference map.

In some embodiments, the method includes receiving a set of digital images, each digital image of the set of digital images depicting a distinct asset corresponding to the category of assets, and each digital image depicting the distinct asset in the state that is free from anomalies associated with the category of assets, and generating the data coding model by training a neural network with the set of digital images.

BRIEF DESCRIPTION OF THE DRAWINGS

FIG. 3 is an example of a digital image progression corresponding to an embodiment of a method for transforming an input image to an anomaly-free state and extracting a difference map.

FIG. 4 is an example of a digital image progression corresponding to an embodiment of a method for altering an image to be used for training a data coding model.

Figure 1:
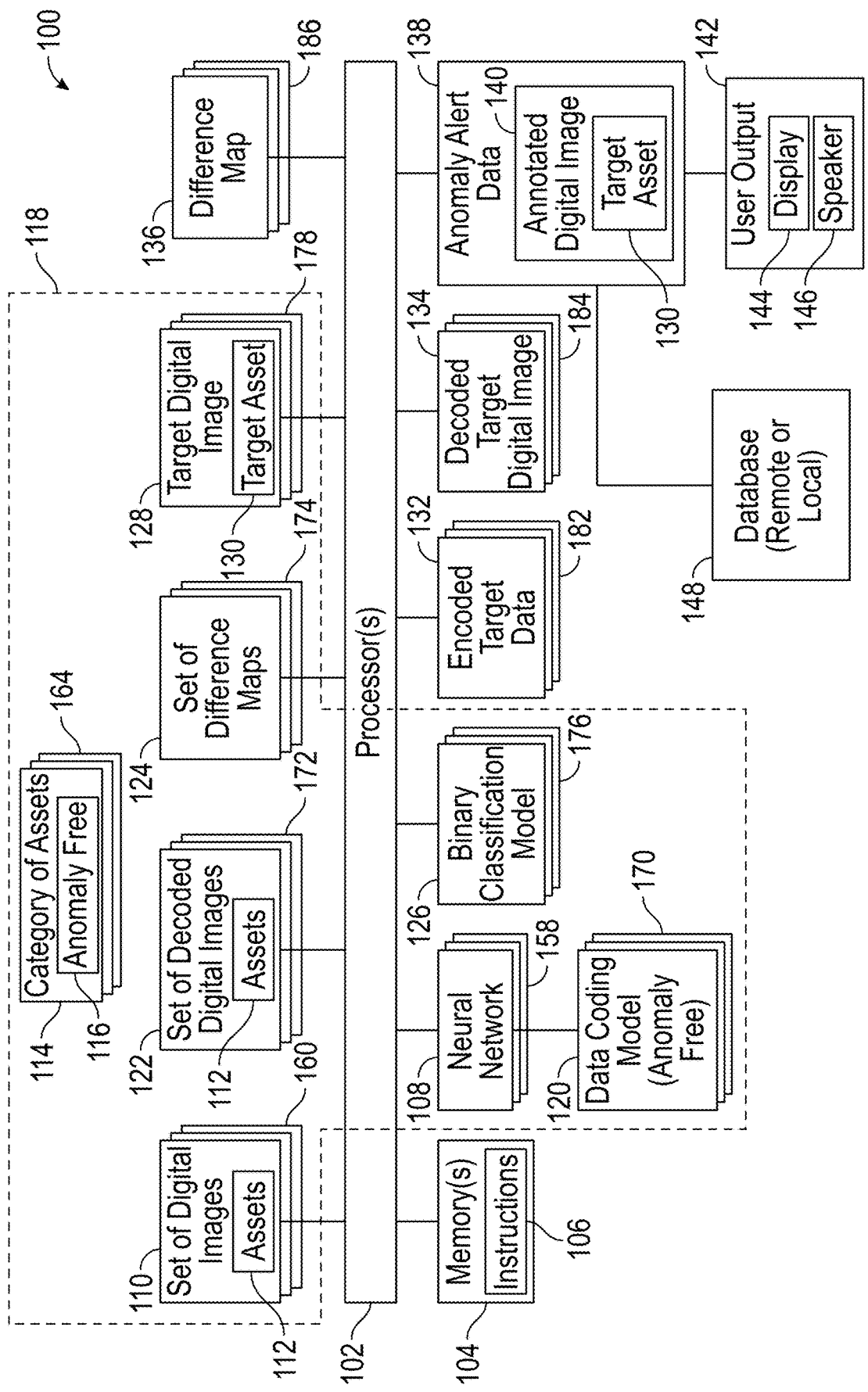
FIG. 1 is a block diagram depicting an embodiment of a system for anomaly detection.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, an embodiment of a system 100 for anomaly detection is depicted. The system 100 may include one or more processors 102 and one or more memories 104 coupled to the one or more processors 102. The one or more memories 104 may store instructions 106 to be executed by the one or more processors 102. For example, the instructions 106, when executed by the one or more processors 102 may initiate or perform any of the operations described herein. The one or more processors 102 and the one or more memories 104 may include a single processor and a single memory at a personal computing device or, alternatively, may include multiple processors and multiple memories distributed within a network (e.g., a local area network, a wide area network, the internet, etc.). A distributed example of the system 100 is further described within the context of FIG. 2.

In some embodiments, the one or more processors 102 may include a central processing unit (CPU), a graphical processing unit (GPU), a digital signal processor (DSP), a peripheral interface controller (PIC), another type of microprocessor, and/or combinations thereof. The one or more processors 102 may be implemented as integrated circuits, field programmable gate arrays (FPGAs), application specific integrated circuit (ASICs), combinations of logic gate circuitry, other types of digital or analog electrical design components, or combinations thereof. The one or more memories 104 may include a memory such as random-access memory (RAM), read only memory (ROM), magnetic disk memory, optical disk memory, flash memory, another type of memory capable of storing data and processor instructions, or the like, or combinations thereof. In some embodiments, the one or more memories 104, or portions thereof, may be located externally or remotely from the one or more processors 102.

In some embodiments, the system 100 includes a neural network 108. Although depicted as distinct and separate, the neural network 108 may be implemented using the one or more processors 102 and the one or more memories 104. Alternatively, the neural network 108 may be implemented remotely. In some embodiments, the neural network 108 may include an autoencoder having one or more encoding layers and one or more decoding layers. The autoencoder may be a deep autoencoder having multiple encoding layers and multiple decoding layers. Further, the autoencoder may be a convolutional autoencoder, relying on a convolution operation to perform transformations of input data. Other types of neural networks may also be used.

In some embodiments, the system 100 operates in two phases: first, using the neural network 108 for training data coding model 170, and second, using the neural network 108 to load the learned data coding model 170 for anomaly detection. Using the neural network 108 enables the system 100 to apply the data coding model 170 to reconstruct images that fall within a same category of images (e.g., having some features or shapes in common) as described further herein, despite differences that may exist between the images themselves. This technical benefit also enables the system 100 to operate on images of a target asset without having any prior images of the target asset, as explained in detail in the following paragraphs. In order to train the neural network 108, the one or more processors 102 may first receive a set of digital images 110.

The set of digital images 110 may depict distinct assets 112 corresponding to a category 114 of assets. For example, the assets 112 may correspond to a physical structure having a particular shape, layout, or function. The category 114 of assets may include all assets that have the same or a similar shape, layout, or function. For example, in some cases the asset 112 may include a fence enclosure having a rectangular layout and the category 114 of assets may include any fence enclosure having the same rectangular layout. As another example, the asset 112 may include a vent structure having a particular shape and the category 114 of assets may include all vent structures having the same particular shape. In yet another example, the asset 112 may include a barrier that operates as a gate and the category 114 of assets may include all barriers that operate as a gate. Other properties (e.g., structures, objects, commodities, goods, or stock) may be used to determine a category of assets. All the assets 112 received at the processor 102 may correspond to the category 114 of assets. In some embodiments, the set of digital images 110 may include aerial or satellite photos of the assets 112.

As an illustrative example, the set of digital images 110 may include a set of aerial photos. The category 114 of assets may correspond to a type of utility structure (e.g., power substations, gas vents, electric transmission poles, oil rigs, etc.). Each type of utility structure may have a similar shape, layout, or function and all of the assets 112 depicted in the set of digital images 110 may have the shape, layout, or function associated with the category 114. A substantial portion of the system 100 may be associated with the category 114 of assets as denoted by the dotted line 118. The system 100 may then be replicated in order to detect anomalies associated with additional categories 164 of assets.

The category 114 of assets may be associated with various anomalies. For example, with respect to a power substation, it may be possible for an animal to get within a fence surrounding the substation. The animal would be a visible anomaly in an aerial photo. Another example of an anomaly may be an open gate, where normally the gate should be closed. As explained herein, typical anomaly detection system may attempt to identify a particular anomaly from a predetermined list of anomaly categories. However, given the high number of different possible anomalies and the many different ways in which any anomaly can present itself in aerial photos, it may not be practical to use such a system. As such, rather than focusing on the individual anomalies associated with the category 114 of assets, the system 100 focuses on a state 116 of the categories of assets that is free from anomalies.

Each of the digital images 110 may be associated with the state 116 that is free from anomalies. The one or more processors 102 may use the set of digital images to train the neural network 108 and thereby generate a data coding model 120. As such the data coding model 120 may also be associate with the state 116 of the category 114 of assets that is free of anomalies. This means that using the neural network 108 in conjunction with the data coding model 120 to encode and then subsequently decode, or reconstruct, any input image will result in an attempt at reconstructing the input image without any anomalies. Any digital images that are not free of anomalies may be filtered out from the digital images 110, in order to ensure accurate training.

After the neural network 108 is trained, and the data coding model 120 is generated, it may be desirable for the system 100 to further have the capability to distinguish between actual anomalies and noise. As such, the set of digital images 110 may be encoded using the neural network 108 and the data coding model 120 and may subsequently be decoded in order to generate a set of decoded digital images 122 depicting the assets 112. Because the set of digital images 110 depicts the assets 112 in the state 116 that is free from anomalies, and because the data coding model 120 is configured to reconstruct images in the state 116 that is free from anomalies, any differences between the set of digital images 110 and the set of decoded digital images 122 may be considered as noise, or otherwise inconsequential to the determination of anomalies. As such, the set of digital images 110 and the set of decoded digital images 122 may be compared to generate a set of difference maps 124, representing the noise.

In some embodiments, the set of difference maps 124 are converted into a binary classification model 126. The binary classification model may be usable to categorize generated difference maps as depicting an anomaly or not depicting an anomaly, which is further described in relation to the second phase of using the system 100 to identify anomalies. In some embodiments, the binary classification model 126 may be a support vector machine model. Other types of binary classification models may be used.

In some embodiments, during the second phase of operation, the system 100 is used to detect an anomaly associated with the category 114 of assets. As an initial operation, the one or more processors 102 may receive a target digital image 128 depicting a target asset 130. The target digital image may be an aerial or satellite photo of the target asset 130.

In some embodiments, in order to determine whether an anomaly exists with respect to target asset 130, the target digital image 128 is transformed, or encoded, using the data coding model 120 to generate encoded target data 132. After the encoded target data 132 has been generated, the one or more processors 102 may generate a decoded target digital image 134 by further transforming, or decoding, the encoded target data 132 using the data coding model 120. And the encoded target data 132 may be further transformed to the decoded target digital image 134 using the data coding model 120. Because the data coding model 120 is a generative representation of the set of digital images 110 that depict the assets 112 in the state 116 that is free from anomalies, the decoded target digital image 134 may be transformed from the encoded target data 132 and associated with the state 116 that is free from anomalies. This means that the decoded target digital image 134 is a reconstructed version of the target digital image 128. It has been transformed using the neural network 108 and the data coding model 120 that learned to ignore any anomalies that may exist in the target digital image 128. The one or more processors 102 may then compare the target digital image 128 to the decoded target digital image 134 to generate a difference map 136.

In some embodiments, in order to ensure that the any potential anomalies shown on difference map 136 are not due to noise, the binary classification model 126 is applied to the difference map 136. The difference map 136 may then by classified as either depicting an anomaly or not depicting any anomaly. In response to a determination that the difference map 136 depicts an anomaly, the one or more processors 102 may generate anomaly alert data 138. The anomaly alert data 138 may include an annotated digital image 140 depicting the target asset 130 with an annotation calling attention to any anomalies.

The system 100 may further include a user output device 142. The user output device 142 may include a display device 144 and a speaker device 146. The display device 144 may be used to output the anomaly alert data 138 to a user. The system 100 may further include a database 148. The anomaly alert data 138 may be stored at the database 148, which may be a remote or a local database.

The system 100 may also detect anomalies associated with additional categories 164 of assets by replicating the operations described herein for those additional categories 164. For example, additional sets of digital images 160 may be received by the one or more processors 102. The additional sets of digital images 160 may be used to train additional neural networks 158 to generate additional data coding models 170. The additional data coding models 170 may correspond to additional categories 164 of assets.

In addition to the additional data coding models 170, additional binary classification models 176 may also be generated by using the additional neural networks 158 and the additional data coding models 170 to encode and decode the additional sets of digital images 160 to generate additional sets of decoded digital images 172. The additional sets of decoded digital images 172 may be compared to the additional sets of digital images 160 to generate additional difference maps 174. The additional difference maps 174 may be converted into the additional binary classification models 176.

The one or more processors 102 may receive additional target digital images 178 depicting additional target assets (not shown in FIG. 1) corresponding to the additional categories 164 of assets. Additional encoded target data 182 may be generated by encoding the additional target digital images 178 using the additional data coding models 170. The one or more processors 102 may then decode the additional encoded target data 182 using the additional data coding models 170 to generate additional decoded target digital images 184. The additional decoded target digital images 184 may be compared to the additional target digital images 178 to generate additional difference maps 186. In response to a determination that at least one of the additional difference maps 186 depicts any anomaly the anomaly alert data 138 may be generated to alert a user of the anomalies.

Figure 10:
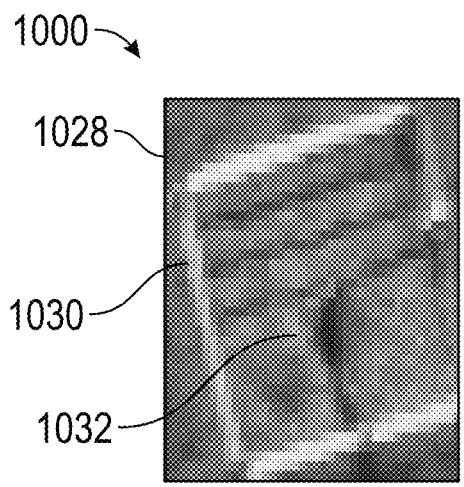
FIG. 10 is an example of a digital image progression in which a target digital image has been reconstructed without any previous non-anomalous images.
Figure 10:
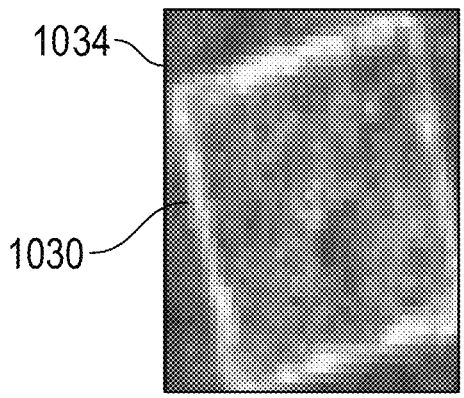
Figure 10:
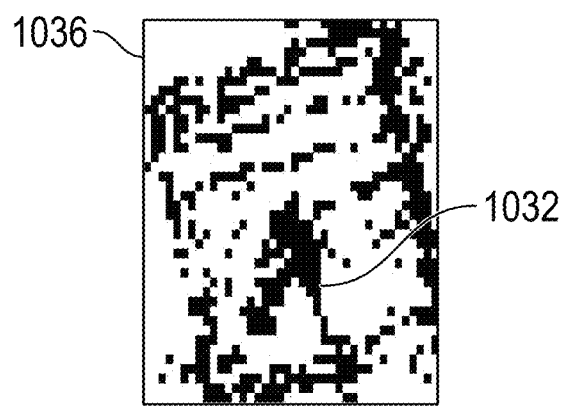

Because the system 100 relies on the neural network 108 to determine whether an anomaly exists, a benefit of the system 100 is that an anomaly may be detected in a target digital image 128 of a target asset 130 without relying on previously taken images of the target asset 130. For example, in an image change-based approach, described in the Background section, an anomaly may detected by comparing a new image of the target asset 130 to a previously taken image of the target asset 130. In contrast, because the data coding model 120 "knows" what the target asset 130 should look like, based on its training, it does not need any previously taken images of the target asset 130, even in cases where the set of digital images 110 used to train the data coding model 120 does not include any images of the target asset 130. As an example, FIG. 10 depicts an example of a digital image progression 1000 in which a target digital image 1028 has been reconstructed without any previous non-anomalous images. The target digital image 1028 may include an anomaly 1032 within a depicted target asset 1030. The data coding model 120 may not have been trained with any images of the target asset 1030, yet the system 100 is able to generate a decoded target digital image 1034 free from the anomaly 1032. A difference map 1036 may then be generated that depicts the anomaly 1032. Further, the system 100 uses a data coding model 120 that is associated with an anomaly free state to fundamentally change the functionality of the neural network 108, as compared to typical anomaly detection systems that would use the neural network 108 to identify or recreate the anomalies themselves instead of the assets 112 in the state 116 that is free of anomalies. Other advantages may exist.

Figure 2:
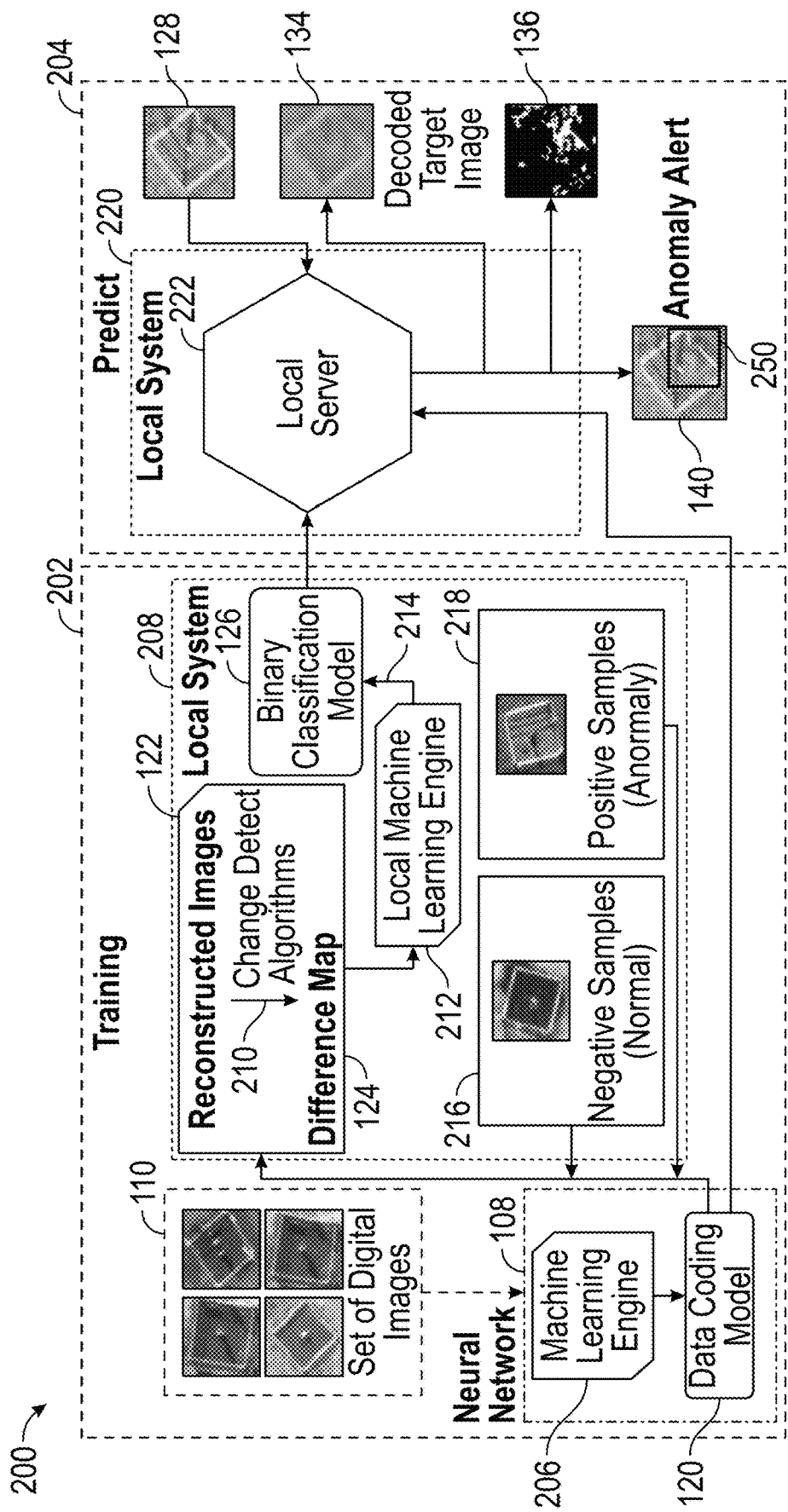
FIG. 2 is a flow diagram depicting an embodiment of a multiphase approach for anomaly detection.

FIG. 2 depicts an embodiment of a system 200 that applies a multiphase approach for anomaly detection. For example, the operations described with reference to FIG. 1 may be performed in a training operation 202 and a prediction operation 204. In some embodiments, the system 200 includes a neural network 108, a training portion 208 of a local system, and a prediction portion 220 of the local system. The neural network 108, the training portion 208, and the prediction portion 220 may all correspond to, and be implemented using, the one or more processors 102 of FIG. 1.

In some embodiments, during operation, a set of digital images 110 may be received by the neural network 108. The set of digital images 110 may depict distinct assets corresponding to a category of assets. Further, each of the digital images 110 may be associated with a state that is free from anomalies.

In some embodiments, the neural network 108 includes a machine learning engine 206 to produce a data coding model 120, such as an autoencoder model. The machine learning engine 206 may train the data coding model 120 using the set of digital images 110. As such the data coding model 120 may also be associate with the state of the category of assets that is free of anomalies. This means that using the neural network 108 to encode and then subsequently decode, or reconstruct, any input image will result in an attempt at reconstructing the input image without any anomalies.

In some embodiments, a separated training portion 208 receives negative samples 216 and positive samples 218 that will use the data coding model 120 to generate reconstructed images. The negative samples 216 may correspond to samples that correspond to a normal state of a depicted asset. That is, the negative samples may depict the asset in the state that is free from anomalies. The positive samples 218 may correspond to samples that correspond to an anomalous state of the depicted asset. That is, the positive samples may depict the asset as having an anomaly (e.g., an animal within a usually fenced region, an open gate, another type of anomaly, etc.). In some cases, additional steps may be performed to diagnose the anomaly to determine what specific anomaly exists. Generally, an anomaly may include any condition where an asset that should remain in a constant state has some sort of change.

Some examples of anomalies that may be detected include a vehicle present at a target asset, the absence of a vehicle that should always be present at a target asset, animals within a fence, fallen poles or other fallen structures, open gates, land erosion, flooding. An open gate may be an anomaly at a fenced enclosure, where it is typical for all enclosures in the category of fence enclosures to have their gates closed.

In some embodiments, in addition to training the data coding model 120, the training portion 208 of the local system further train a classification model, such as a binary classification model 126 that classifies images as depicting an anomaly or not depicting an anomaly. In order to generate the binary classification model 126, the training portion 208 of the local system may receive a set of decoded digital images 122, or reconstructed digital images. A change detect algorithm 210 may be applied to the set of decoded digital images 122 in order to generate a set of difference maps 124. The set of difference maps may be fed into a local machine learning engine 212, which may use a support vector machine 214 to generate the binary classification model 126. Once both the data coding model 120 and the binary classification model 126 are generated and trained, they may be used during the prediction operation 204 to detect anomalies.

In some embodiments, the prediction portion 220 of the local system includes a local server 222, which corresponds to at least one of the one or more processors 102 of FIG. 1. The local server 222 may be configured to receive the data coding model 120 from the neural network 108. Alternatively, the local server 222 may access the data coding model 120 remotely. The local server 222 may further be configured to receive a target digital image 128 depicting a target asset. The local server 222 may use the data coding model 120 to generate encoded target data and then generate a decoded target digital image 134 by decoding the encoded target data using the data coding model 120. The local server 222 may compare the target digital image 128 to the decoded target digital image 134 to generate a difference map 136. In response to a determination that the difference map 136 depicts any anomaly, the local server 222 may generate anomaly alert data that includes an annotated digital image 140. For example, the annotated digital image 140 may include an annotation 250 showing a position of a detected anomaly. The annotation 250 may help a user locate an anomaly within the annotated digital image 140.

A benefit of the system 200 is that the data coding model 120 may be generated and trained and subsequently shared with a local server 222. Thus, the local server 222 does not need access to any training data, such as the set of digital images 110 in order to determine whether an anomaly exists. As such, a previous image of the target asset depicted in the target digital image 128 may not be needed. Other advantages may exist.

Referring to FIG. 3, a digital image progression 300 is depicted. The digital image progression 300 may correspond to a process that uses a binary classification model to determine the existence of anomaly, such as the binary classification model 126. The first image is a digital image 302 depicting an asset 312. The digital image 302 may correspond to a single image taken from the set of digital images 110 and the asset may correspond to a single asset taken from the assets 112. In particular, the digital image 302 may depict the asset 312 in a state that is free from anomalies, however contains noise. While the data coding model 120 may be trained in an unsupervised or self-supervised process, the binary classification model 126 may be trained in a supervised process, receiving feedback in the form of the negative samples 216 and the positive samples 218.

The digital image 302 may encoded and subsequently decoded, as described herein, to produce a decoded digital image 304. The decoded digital image 304 may correspond to a single image taken from the set of decoded digital images 122. As seen in FIG. 3, the decoded digital image 304 may be slightly altered compared to the digital image 302. This is because the decoded digital image 304 has been artificially reconstructed based on the learned parameters of a data coding model (e.g., the data coding model 120) of what the asset 312 should look like when it excludes any anomalies.

The digital image 302 may be compared to the decoded digital image 304 to generate a difference map 306, which may correspond to a single difference map taken from the set of difference maps 124. The difference map 306 depicts some noise 308. The noise 308 represents the difference between an actual version of the asset 312 in a state that is free from anomalies and an abstracted version of the asset 312 in the state that is free from anomalies, with the abstracted version being abstracted by the data coding model used. In order to avoid inadvertently classifying the noise as an anomaly, the difference map 306 may be used, along with other difference maps from the set of difference maps 124, to generate a binary classification model, such as the binary classification model 126, to identify noise in a difference map.

Referring to FIG. 4, a digital image progression 400 is depicted. The digital image progression 400 may correspond to a process for altering a digital image for use with training a neural network. The first image is a digital image 402 depicting an asset 412 and a feature 404. The feature may be an anomaly. Alternatively, the feature may not constitute an anomaly, but may, if used to train a neural network, reduce the effectiveness of the training. In the particular example of FIG. 4, the feature 404 may correspond to a crack in the ground due to earth erosion that has formed near the asset 412. The digital image 402 may correspond to a single image taken from the set of digital images 110 and the asset 412 may correspond to a single asset taken from the assets 112.

In some embodiments, in order to perform effective training, the feature 404 is removed artificially from the digital image 402 to generate an altered digital image 406. The altered digital image 406 may then replace the digital image 402 in the set of digital images 110. The altered digital image 406 may be encoded and decoded by the neural network 108 to generate a decoded digital image 408. The decoded digital image 408 may be compared to the digital image 402 to generate a difference map 410. The difference map 410 may clearly show detection 414 corresponding to the feature 404. The difference map 410 may then make up part of the set of difference maps 124 used to generate the binary classification model 126.

Figure 5:
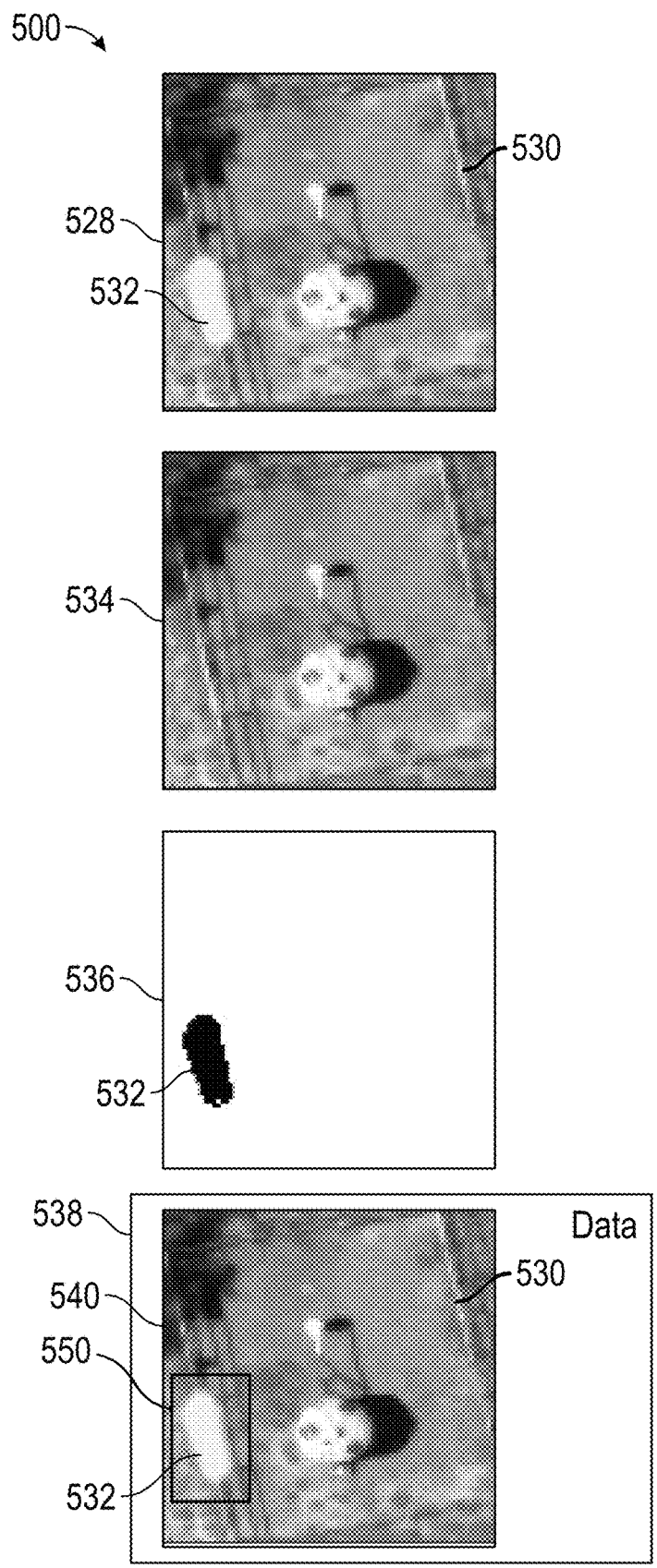
FIG. 5 is an example of a target digital image progression corresponding to an embodiment of a method for detecting an anomaly.

Referring to FIG. 5, a target digital image progression 500 is depicted. The progression 500 may corresponding to a process for detecting an anomaly 532. The first image is a target digital image 528 depicting a target asset 530. For example, the target asset 530 may correspond to a fenced-in piece of equipment. The anomaly 532 may be a portion of the fence that is missing or otherwise broken or obstructed. The target asset 530 may be associated with a category of target assets. For example, the category of assets may include similar assets that include a similarly shaped structure positioned within a rectangular fence area as depicted in the target digital image 528. The target digital image 528 may correspond to the target digital image 128 and the target asset 530 may correspond to the target asset 130.

Using a neural network, such as the neural network 108, along with a data coding model, such as the data coding model 120, the target digital image 528 may be encoded and subsequently decoded to generate a decoded target digital image 534. Because the data coding model 120 is trained to reconstruct the digital images depicting assets within the category of assets as being without any anomalies, the decoded target digital image 534 may be reconstructed without the anomaly 532.

The target digital image 528 may be compared to the decoded target digital image 534 to generate a difference map 536. The difference map 536 may correspond to the difference map 136. As shown in FIG. 5, the difference map 536 depicts the anomaly 532. In response to a determination that the anomaly 532 is visible in the difference map 536, anomaly alert data 538 may be generated. The anomaly alert data 538 may include an annotated digital image 540 that depicts the target asset 530 and the anomaly 532 along with an annotation 550 indicating a position, or otherwise highlighting, the anomaly 532. The anomaly alert data 538 may be sent to the user output device 142 for display to a user. In other cases, where an anomaly does not exist, the anomaly alert data may not be generated.

Figure 6:
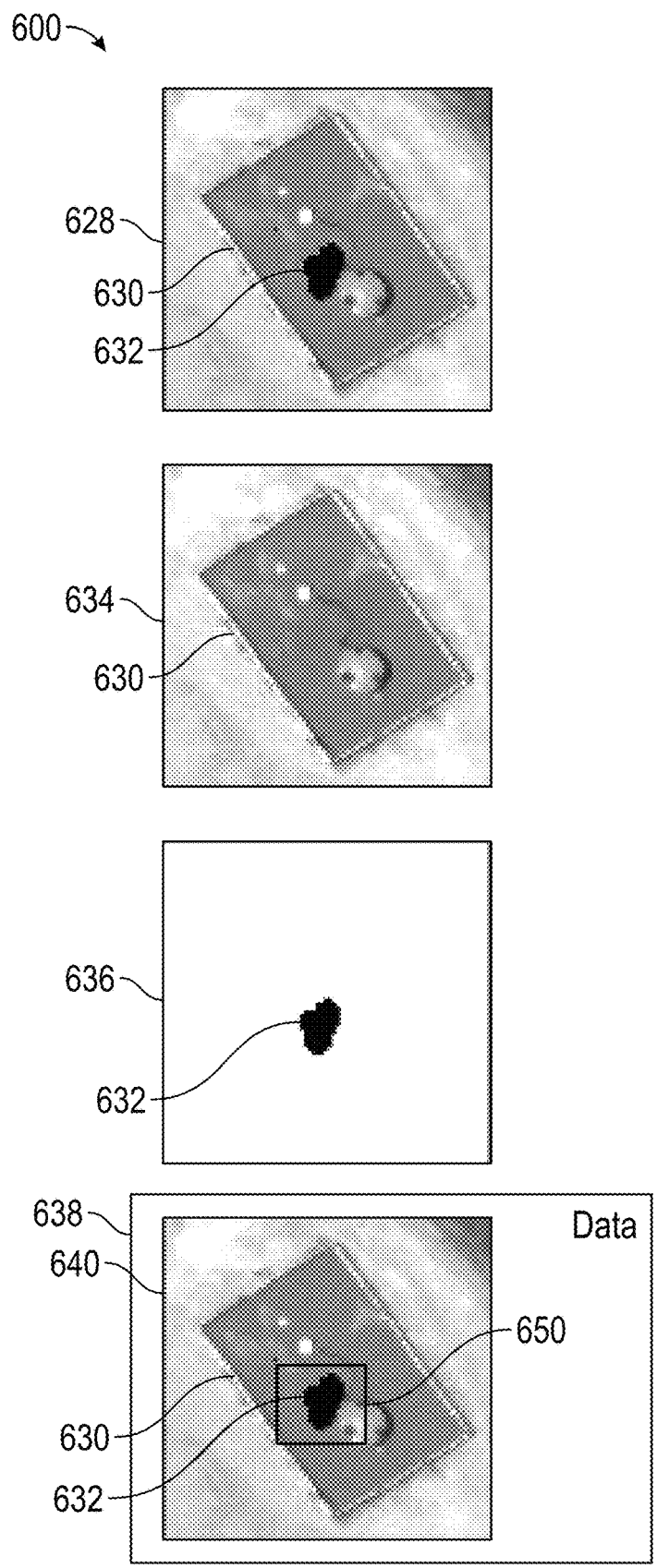
FIG. 6 is an example of a target digital image progression corresponding to an embodiment of a method for detecting an anomaly.

Referring to FIG. 6, a target digital image progression 600 is depicted. The progression 600 may corresponding to a process for detecting an anomaly 632 in a for a target asset 630 that is different from, but in the same category as, the target asset 530. The first image may be a target digital image 628 depicting the target asset 630.

Using the neural network 108, along with the data coding model 120, the target digital image 628 may be encoded and subsequently decoded to generate a decoded target digital image 634 depicting the target asset 630 as not including any anomalies. The target digital image 628 may be compared to the decoded target digital image 634 to generate a difference map 636, which may depict the anomaly 632.

In response to a determination that the anomaly 632 is visible in the difference map 636, anomaly alert data 638 may be generated. The anomaly alert data 638 may include an annotated digital image 640 that depicts the target asset 630 and the anomaly 632 along with an annotation 650 indicating a position, or otherwise highlighting, the anomaly 632. The anomaly alert data 638 may be sent to the user output device 142 for display to a user. As shown in FIG. 6, a single data coding model, such as the data coding model 120, can be used to detect anomalies in many different assets belonging to the same category of assets. Further, every type of anomaly that may exist, need not be documented ahead of time because instead of being trained to reconstruct any particular anomaly, the data coding model 120 may be trained to reconstruct a depiction of assets in a state that is free from anomalies. Anomalies may then be detected through comparison.

Figure 7:
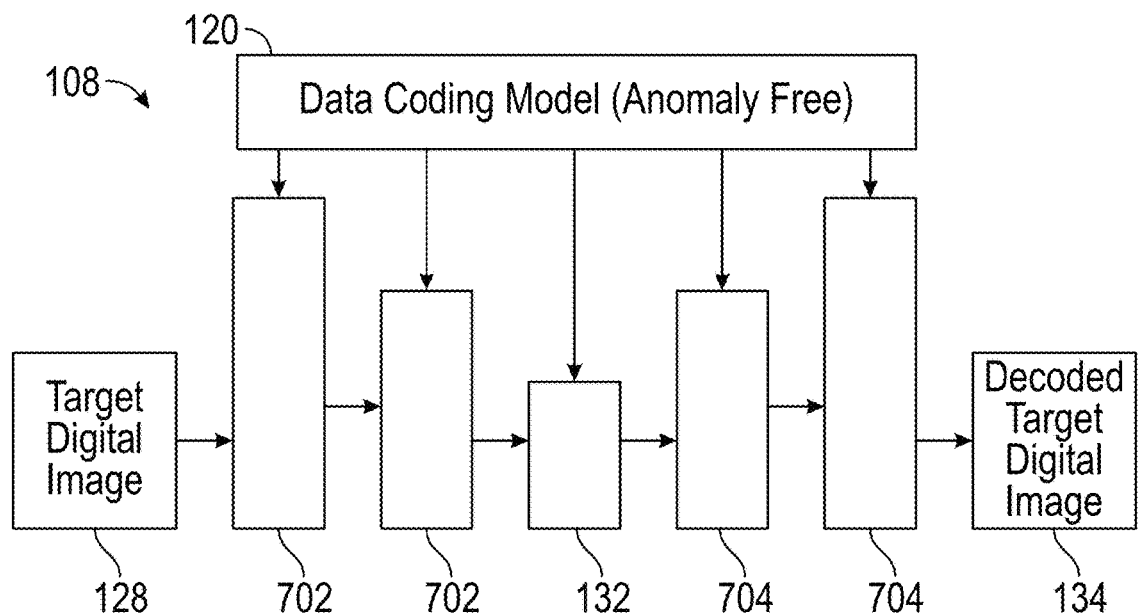
FIG. 7 is a block diagram of an embodiment of a neural network.

Referring to FIG. 7 a block diagram of an embodiment of a high level architecture of neural network 108 is depicted. The neural network 108 may be an autoencoder including multiple encoding layers 702 and multiple decoding layers 704. At each of the multiple encoding layers 702 and the multiple decoding layers 704, a data coding model 120 may be learned as a set of mathematical variables and operations from the set of training images 110 constraint by the architecture of neural network 108. The data coding model 120 may be associated with a state of a category of assets that is free from anomalies.

During operation, the neural network 108 may receive a target digital image 128 and may encode the target digital image 128 using the multiple encoding layers 702 in conjunction with the data coding model 120. The process may result in encoded target data 132. The encoded target data 132 may then be decoded, or reconstructed, using the multiple decoding layers 704 to generate a decoded target digital image 134. However, because the data coding model 120 is associated with the state that is free from anomalies, any anomalies depicted in the target digital image 128 may not be depicted in the decoded target digital image 134. By comparing the target digital image 128 with the decoded target digital image 134, anomalies may be detected automatically.

Figure 8:
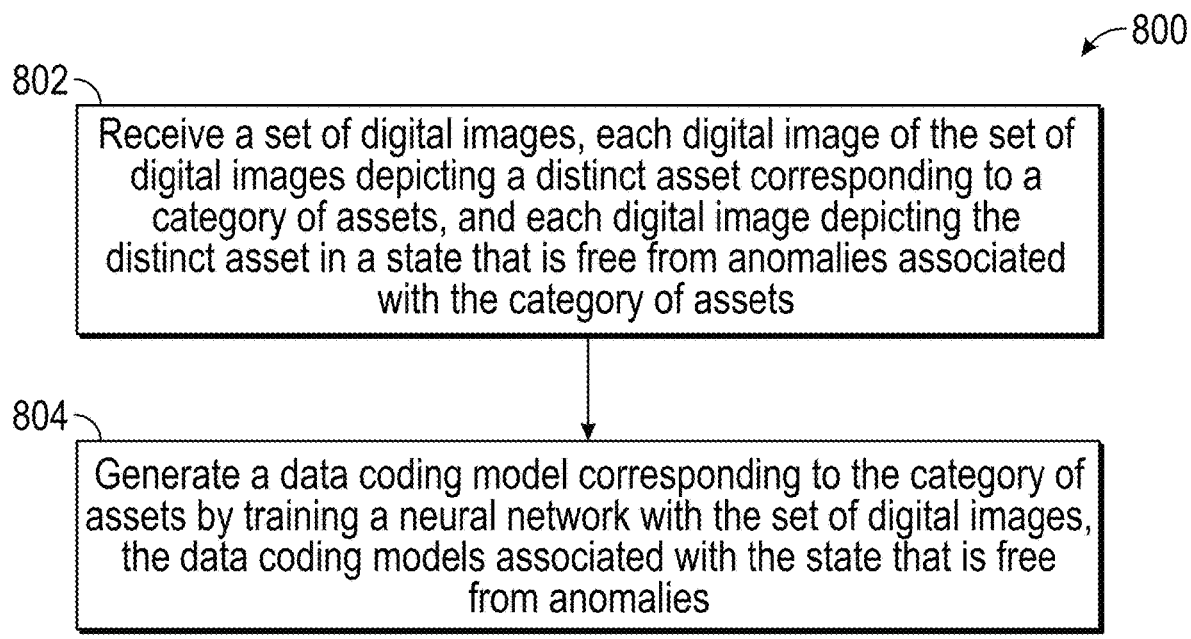
FIG. 8 is a flow diagram depicting an embodiment of a method for training a neural network for anomaly detection.

Referring to FIG. 8, an embodiment of a method 800 for training a neural network for anomaly detection is depicted. The method 800 may include receiving a set of digital images, each digital image of the set of digital images depicting a distinct asset corresponding to a category of assets, and each digital image depicting the distinct asset in a state that is free from anomalies associated with the category of assets, at 802. For example, the set of digital images 110 may be received at the one or more processors 102.

The method 800 may further include generating a data coding model corresponding to the category of assets by training a neural network with the set of digital images, the data coding model associated with the state that is free from anomalies, at 804. For example, the data coding model 120 may be generated based on the set of digital images 110.

A benefit of the method 800 is that a data coding model may be trained to reconstruct images depicting assets in a state that is free from anomalies, which, when compared to the original image enables detection of an anomaly in the original image. The data coding model may then be distributed for anomaly detection at systems that may not have the capacity to maintain large databanks of previous image data. Other benefits may exist.

Figure 9:
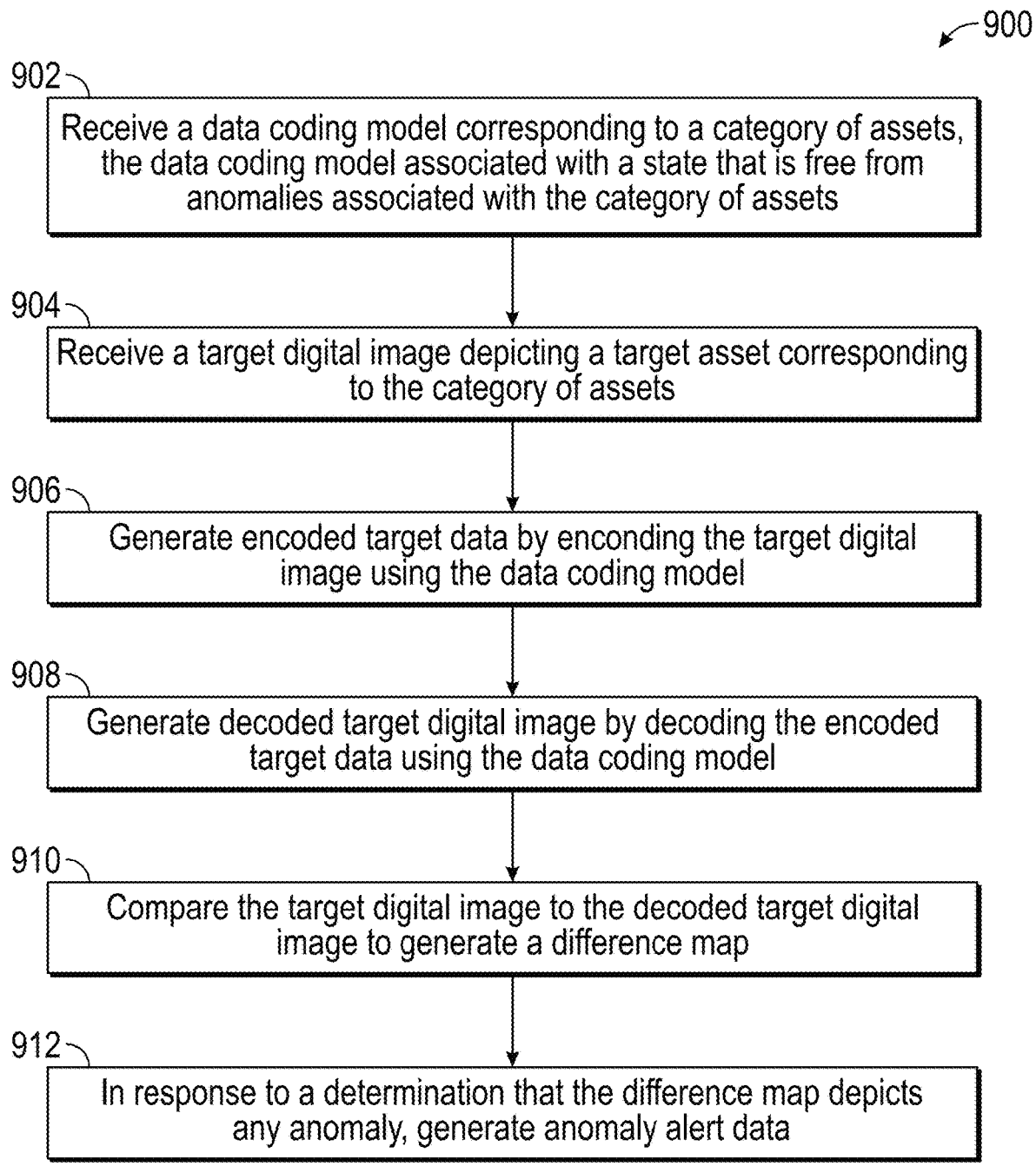
FIG. 9 is a flow diagram depicting an embodiment of a method for anomaly detection using a neural network.

Referring to FIG. 9, an embodiment of a method 900 for anomaly detection is depicted. The method 900 may be a continuation of, and can be used together with, the method 800. The method 900 may include receiving a data coding model corresponding to a category of assets, the data coding model associated with a state that is free from anomalies associated with the category of assets, at 902. For example, the one or more processors 102 may receive the data coding model 120. As another example, the local server 222 may receive the data coding model 120 from the neural network 108, which may be remote from the local server 222.

The method 900 may further include receiving a target digital image depicting a target asset corresponding to the category of assets, at 904. For example, the target digital image 128 may be received at the one or more processors 102.

The method 900 may also include generating encoded target data by encoding the target digital image using the data coding model, at 906. For example, the encoded target data 132 may be generated.

The method 900 may include generating a decoded target digital image by decoding the encoded target data using the data coding model, at 908. For example, the decoded target digital image 134 may be generated.

The method 900 may further include comparing the target digital image to the decoded target digital image to generate a difference map, at 910. For example, the target digital image 128 may be compared to the decoded target digital image 134 to generate the difference map 136.

The method 900 may also include, in response to a determination that the difference map depicts any anomaly, generating anomaly alert data, at 912. For example, the one or more processors 102 may determine that the difference map depicts an anomaly and may generate the anomaly alert data 138.

A benefit of the method 900 is that an anomaly may be detected in a target digital image of a target asset without relying on previously taken images of the target asset. Further, the method 900 uses a data coding model that is associated with an anomaly free state to fundamentally change the functionality of a neural network, as compared to typical anomaly detection methods that would use the neural network to identify or recreate the anomalies themselves instead of the assets in a state that is free of any anomalies. Other advantages may exist.

Although various embodiments have been shown and described, the present disclosure is not so limited and will be understood to include all such modifications and variations as would be apparent to one skilled in the art.

What is claimed is:

1. A method comprising:
    receiving a set of digital images, each digital image of the set of digital images depicting a distinct asset corresponding to a category of assets, and each digital image depicting the distinct asset in a state that is free from anomalies associated with the category of assets;
    generating a data coding model corresponding to the category of assets by training a neural network with the set of digital images, the data coding model associated with the state that is free from anomalies;
    receiving a target digital image depicting a target asset corresponding to the category of assets;
    generating encoded target data by transforming the target digital image using the data coding model;
    generating a decoded target digital image by further transforming the encoded target data using the data coding model, the decoded target digital image associated with the state that is free from anomalies;
    comparing the target digital image to the decoded target digital image to generate a difference map;
    in response to a determination that the difference map depicts an anomaly, generating anomaly alert data;
    generating additional data coding models corresponding to additional categories of assets by training additional neural networks with additional sets of digital images, the additional data coding models associated with additional states that are free from anomalies associated with the additional categories of assets; and
    receiving additional target digital images depicting additional target assets corresponding to the additional categories of assets;
    generating additional encoded target data by encoding the additional target digital images using the additional data coding models;
    generating additional decoded target digital images by decoding the additional encoded target data using the additional data coding models;
    comparing the additional target digital images to the additional decoded target digital images to generate additional difference maps; and
    in response to a determination that at least one of the additional difference maps depicts any anomaly, generating anomaly alert data.

2. The method of claim 1, wherein the neural network is an autoencoder, wherein generating the encoded target data includes encoding the target digital image using one or more encoding layers of the autoencoder, and wherein generating the decoded target digital image includes decoding the encoded target data using one or more decoding layers of the autoencoder.

3. The method of claim 2, wherein the autoencoder is a deep autoencoder having multiple encoding layers and multiple decoding layers, a convolutional autoencoder, or both.

4. The method of claim 1, wherein the anomaly alert data includes an annotated digital image depicting the target asset.

5. The method of claim 1, further comprising sending the anomaly alert data to a user output device a database or both, the user output device including a display device, a speaker device or both, the database being a remote or local database.

6. The method of claim 1, further comprising:
generating a set of decoded digital images corresponding to the set of digital images using the data coding model;
comparing the set of decoded digital images to the set of digital images to generate a set of difference maps;
converting the set of difference maps to a binary classification model; and
applying the binary classification model to the difference map to categorize the difference map as depicting any anomaly or not depicting any anomaly.

7. The method of claim 6, wherein the binary classification model is a support vector machine model.

8. The method of claim 1, wherein the target digital image includes an aerial or satellite photo of the target asset, wherein the target asset is a physical structure, and wherein the category of assets includes other assets having a shape, layout, or function that corresponds to a shape, layout, or function of the target asset.

9. The method of claim 1, further comprising:
altering one or more digital images of the set of digital images to remove a feature that does not correspond to any anomaly associated with the category of assets.

10. A system comprising:
one or more processors; and
one or more memories, the one or more memories including instructions that, when executed by the one or more processors cause the one or more processors to:
receive a data coding model corresponding to a category of assets, the data coding model associated with a state that is free from anomalies associated with the category of assets;
receive a target digital image depicting a target asset corresponding to the category of assets;
generate encoded target data by encoding the target digital image using the data coding model;
generate a decoded target digital image by decoding the encoded target data using the data coding model;
compare the target digital image to the decoded target digital image to generate a difference map; and
in response to a determination that the difference map depicts any anomaly, sending anomaly alert data, including an annotated digital image of the target asset, to a user output device for display to a user.

11. The system of claim 10, wherein the instructions further cause the one or more processors to:
receive a set of digital images each digital image of the set of digital images depicting a distinct asset corresponding to the category of assets, and each digital image depicting the distinct asset in the state that is free from anomalies associated with the category of assets; and
generate the data coding model by training a neural network with the set of digital images.

12. The system of claim 11, wherein the neural network is an autoencoder, wherein generating the encoded target data includes encoding the target digital image using one or more encoding layers of the autoencoder, and wherein generating the decoded target digital image includes decoding the encoded target data using one or more decoding layers of the autoencoder, and wherein the autoencoder is a deep autoencoder having multiple encoding layers and decoding layers, a convolution autoencoder, or both.

13. The system of claim 11, wherein the instructions further cause the one or more processors to:
generate a set of decoded digital images corresponding to the set of digital images using the data coding model;
compare the set of decoded digital images to the set of digital images to generate a set of difference maps;
convert the set of difference maps to a binary classification model; and
apply the binary classification model to the difference map to categorize the difference map as depicting any anomaly or not depicting any anomaly.

14. The system of claim 11, wherein one or more digital images of the set of digital images is artificially altered to remove a feature that does not correspond to any anomaly associated with the category of assets.

15. The system of claim 10, further comprising:
a user output device, the user output device including a display device, a speaker device, or both, wherein the instructions further cause the one or more processors to send the anomaly alert data to the user output device.

16. The system of claim 10, wherein the target digital image includes an aerial or satellite photo of the target asset, wherein the target asset is a physical structure, and wherein the category of assets includes other assets having a shape, layout, or function that corresponds to a shape, layout, or function of the target asset.

17. A method comprising:
receiving multiple target digital images depicting target assets corresponding to multiple categories of assets;
generating multiple sets of encoded target data by encoding the multiple target digital images using multiple data coding models corresponding to the multiple categories of assets, the multiple data coding models associated with states that are free from anomalies associated with the multiple categories of assets;
generating multiple decoded target images by decoding the multiple sets of encoded target data using the multiple data coding models; and
comparing the multiple decoded target images to the multiple decoded target images to generate multiple difference maps.

18. The method of claim 17, further comprising:
receiving multiple sets of digital images, each digital image of the multiple sets depicting a distinct asset corresponding to the multiple categories of assets, and each digital image depicting the distinct asset in the states that are free from anomalies associated with the multiple categories of assets; and
generating the multiple data coding models by training multiple neural networks with the multiple sets of digital images.

19. The method of claim 17, further comprising:

generating multiple sets of decoded digital images corresponding to the multiple sets of digital images using the multiple data coding models;

comparing the multiple sets of decoded digital images to the multiple sets of digital images to generate multiple sets of difference maps;

converting the multiple sets of difference maps to multiple binary classification models; and applying the multiple binary classification models to the multiple difference maps to categorize the multiple difference maps as depicting any anomaly or not depicting any anomaly.

20. The method of claim 19, further comprising:

in response to a determination that at least one of the multiple difference maps depicts an anomaly, generating anomaly alert data.

* * * * *